United States Patent [19]

Dean

[11] 3,910,402

[45] Oct. 7, 1975

[54] ROUTING AND CONVEYING APPARATUS
[75] Inventor: George A. Dean, Kansas City, Mo.
[73] Assignee: Dean Research Corporation, Kansas City, Mo.
[22] Filed: Mar. 12, 1973
[21] Appl. No.: 340,330

[52] U.S. Cl. ............ 198/38; 198/31 R; 198/31 AC; 198/127 R
[51] Int. Cl.² .......................................... B65G 43/00
[58] Field of Search ... 198/31 R, 31 AC, 38, 127 R, 198/236, 283, 286, 262, 237

[56] References Cited
UNITED STATES PATENTS
3,174,613  3/1965  Insolio ............................. 198/127
3,333,714  8/1967  Sermet ............................. 198/127
3,565,233  2/1971  Hinman ........................... 198/31 R Primary Examiner—Evon C. Blunk
Assistant Examiner—Joseph E. Valenza
Attorney, Agent, or Firm—Bierman & Bierman

[57] ABSTRACT

A device of the conveyor type for moving sheets of material, the device being of the type having an entry location and a plurality of output stations and comprising means for routing one or more of said sheets into a selected one of the output stations, said output stations being positioned along the sides of the device. If desired, a secondary device for separating sheets of material running two or more abreast is provided.

12 Claims, 9 Drawing Figures

ROUTING AND CONVEYING APPARATUS

This invention relates to materials handling apparatus and more particularly to a method and device for conveying and selectively routing one or more sheets of material from an entry location to a selected one of a plurality of output stations.

The present invention is useful for conveying and selectively routing any type of sheet, regardless of composition. However, it is particularly well suited for use with fragile sheets, such as those made of glass. The present invention is designed to convey and selectively route fragile sheets in a manner which substantially reduces the breakage normally associated with the rapid handling of such sheets.

In accordance with the present invention, means are provided for conveying and selectively routing one or more sheets of material from an entry location to a selected output station. A plurality of output stations are located along the periphery of the device parallel to the general direction of movement of the sheets. The sheets are moved into the output stations directly by the device, in contrast to the prior art which generally utilized spurs, corner tables, transfer tables or jump sections in order to control and/or direct sheet material flow from one station to another. In addition, the instant invention permits the elimination of overhead and over conveyor cranes and related equipment.

In its preferred form, the device comprises a conveyor system which at least in part consists of a plurality of directionally orientatable rolls. Sheets enter the device and are moved onto the rolls which convey and route the sheets into selected output stations positioned along the direction of movement of the sheets and on either side of the conveyor. Routing is achieved by re-orienting roll position to change the selected direction of sheet movement. Routing can be controlled manually, but in the preferred embodiment, a contol unit comprising a computer and conventional interfacing equipment between the computer and conveyor system is utilized. Because of its speed and continuity of operation, the present invention is particularly adapted for use in sorting and accumulating sheets of material as they continuously emerge from a manufacturing assembly line. However, other uses will be readily apparent to those skilled in the art, as the device is more fully described.

In operation, the sheets enter on the conveyor at one end of the device and are moved towards the other end of the device by the conveying and routing means which, in the preferred form of the device, consists of a plurality of rolls, preferably of rubber or metal with rubber surfaces, distributed along the length of the device. The rolls are rotatable in order to displace the sheets along the device. Preferably, the rolls are initially oriented such that the sheets are moved directly toward the opposite end of the device.

A sheet, after entering the device, will be moved along the device until it approaches the output station toward which the sheet is to be routed. Means are provided to sense the presence of the sheet at which point the rolls which define the path between the sheet and the selected output station are re-oriented to change the direction of movement of the sheet to guide the sheet into the output station.

Output station equipment may be a conventional accumulator, a scrap bin or any other type of equipment. The removed sheet may then be loaded, crated, transferred to another area or discarded, depending upon the equipment used and the purposes of the user.

The rolls are returnable to their original orientation after the sheets have passed over them. The remaining sheets continue down the device until they approach the selected output station to which the sheet will be routed. The process is continuous and the speed of conveying and routing is adjustable to accommodate as many sheets as necessary.

Routing among the output stations may be achieved automatically by sensors placed at various locations along the device. As a sheet nears a selected output station, the sensor signals the presence of the sheet to a control unit. Upon receipt of the signal, the control unit rotates and reorients all rolls under the sheet and in sequence the remaining rolls in the path of the sheet as the sheet passes over them. As the sheet moves forward, all rolls trailing the sheet return to normal.

The control unit is pre-programmed with information concerning the type and capacity of the equipment at the output stations and the size, speed and number of the sheets being conveyed. With this information, including the number and location of all rolls, roll orientation may be changed at a selected time to route a particular sheet to a selected output station. Also, broken sheets can be automatically identified and routed to discarding bins located at one or more of the output stations.

In many situations, the instant apparatus may be used to move a plurality of sheets abreast of each other. In such case, it is preferred to utilize a separator to insure that the sheets are sufficiently separated to prevent one or more of the sheets from interfering with the movement of other sheets. The separation of sheets is best performed by a separator section located upstream of the conveyor equipment described above.

The separator section is provided with a plurality of rolls which act as a conveyor for the sheets during sheet travel over the separator section. The rolls are also orientable to one or more different angular positions, both above and below the normal or straight ahead direction of sheet movement. The rolls are preferably individually orientable to at least two or three different angular positions to move the traveling sheets apart a selected distance, usually on the order of about ½ to 2 inches, to assure that adjacent sheets are not traveling over a single roll at the same time when the sheets have reached the conveyor apparatus for movement to the various output stations. The various rolls in the separator section are controlled by the control unit in the same manner as are the rolls in the conveyor system.

The apparatus herein can be beneficially employed in a continuous sheet manufacturing operation where the sheets are moved directly from the point of manufacture to the various output stations. In any situation in which a plurality of sheets carried abreast are to be moved, the sheets will often be moved to the separator and/or conveyor system by a conventional ribbon conveyor. Ribbon conveyors tend to shift during travel. For best results, ribbon shift is monitored and the shift, if any, is fed to the control unit computer. The computer, upon receipt of the information, will automatically reorient the proper rolls in either the separator section, the conveyor, or both, in order to orient the moving sheets properly for movement into the selected output station.

The accompanying drawings illustrate preferred embodiments of the present invention wherein like numerals refer to like parts and wherein.

Figure 1:
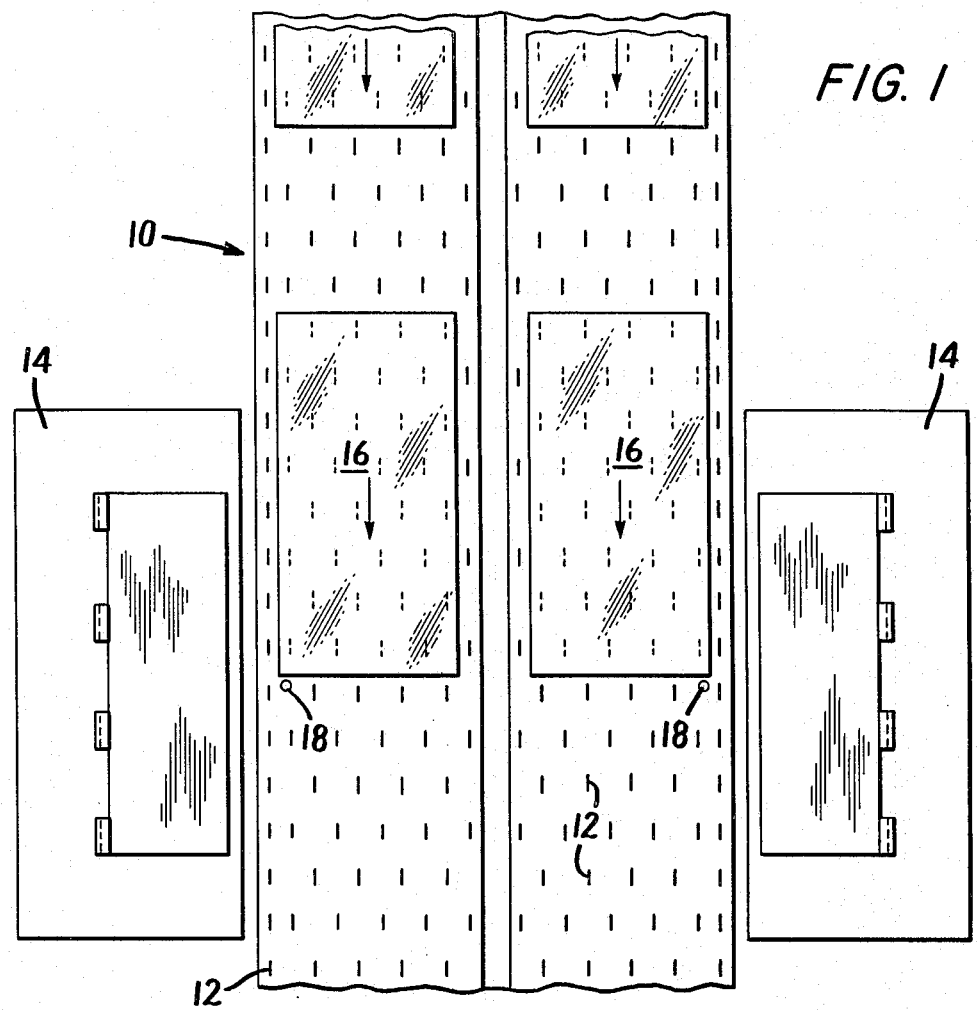
FIG. 1 is a top view of a portion of the device showing the rolls in their original orientation.

The present invention, as seen in FIG. 1, comprises a table-like structure 10 made up of a plurality of rolls 12, each being rotatably mounted in a separate roll assembly 13 (FIG. 4), as will be further explained below. Along each side of the device are located output stations 14 at which acceptance equipment, such as accumulators, are located. Although each roll is shown mounted in a separate roll assembly, it is to be understood that more than one roll may be mounted in a single assembly if desired. Modification of the assembly to achieve this change is well within the skill of the art to which this invention pertains.

Figure 4:
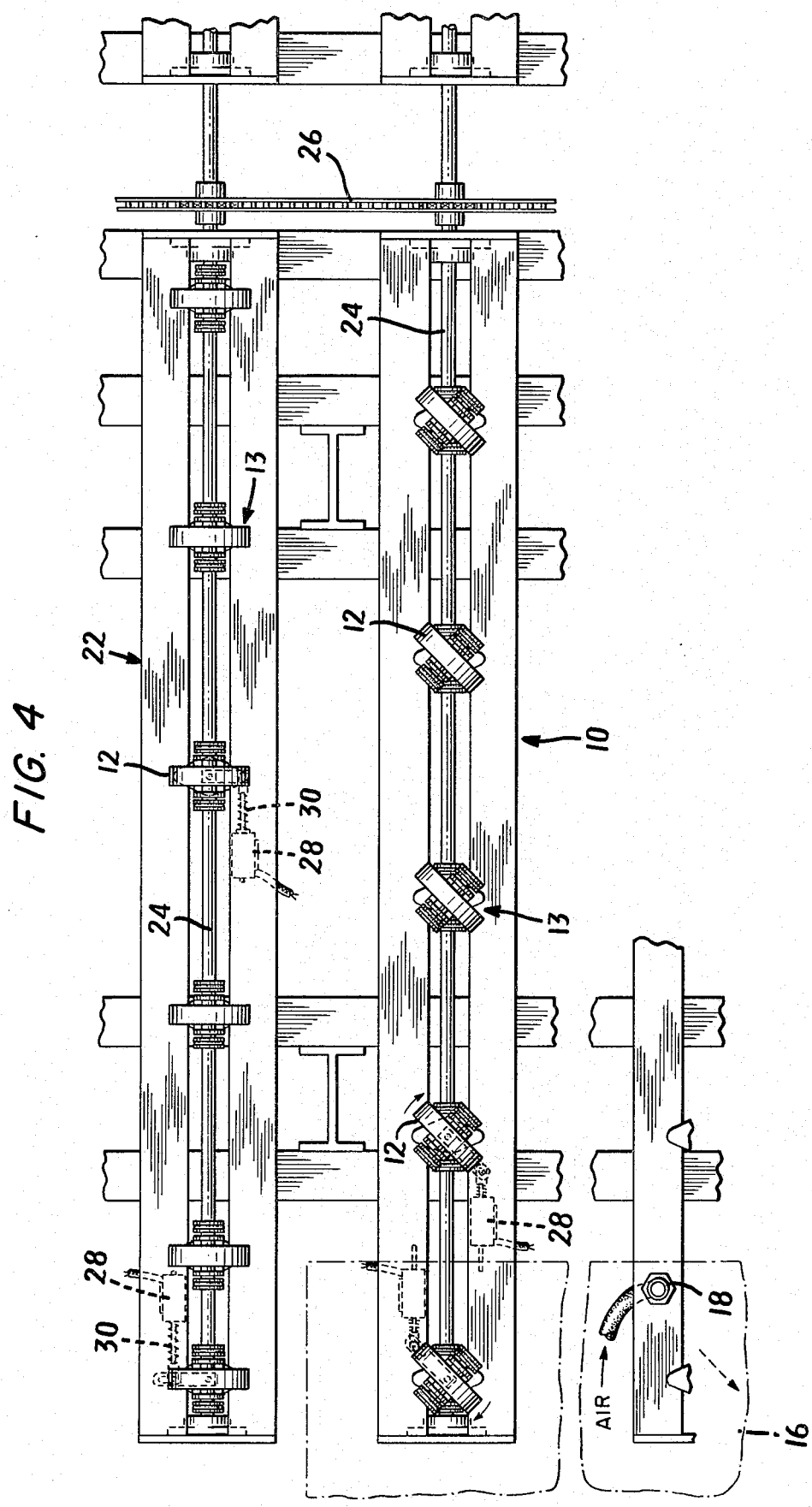
FIG. 4 is a top view of a section of the device showing a sheet being routed by re-oriented rolls.

At the entrance end of the device (not shown in this view) the sheets 16 are placed upon the device, either singly or in rows. As the sheets 16 enter the device 10, the rolls 12 are oriented to move the sheets 16 in a straight path along the length of the device as shown in FIG. 1. Placed along the device at various locations adjacent each output station are a plurality of sensors 18 which sense the location of each sheet 16 on the device. Each of the sensors 18 are connected to a control unit 20 which comprises conventional computer and interfacing equipment. Sensors 18 can be of the electronic type (FIG. 7) or pneumatic (FIG. 4). The control unit 20 is programmed by conventional means, such as punch cards or magnetic tape, with information concerning the number, size and shape of the sheets, the conveyor speed, the separation distance between succeeding adjacent sheets, and the types and capacity of the equipment at the output stations. With this information, the computer selects an output station for each of the sheets, as will be more fully explained herein below.

Figure 2:
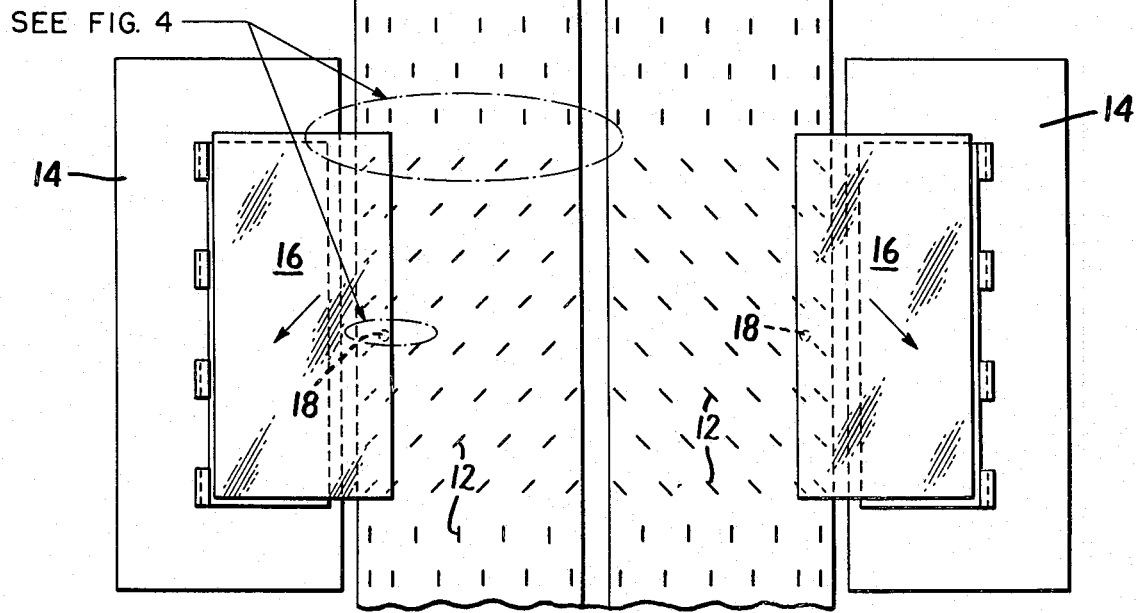
FIG. 2 is a view similar to that of FIG. 1 showing the sheets as they approach the selected output stations and showing the re-orientation of the rolls to route the sheets towards the output stations.

As seen in FIG. 2, as the leading edge of a particular sheet 16 approaches the sensors adjacent a selected output station 14, the rolls 12 positioned under the sheet and which are in the path between the sheet and the station receive a signal which causes control unit 20 to reorient the necessary rolls as the sheet moves over them to guide the sheet into the station. Sensors 18 also sense the presence of the trailing edge of the sheet. After the trailing edge of the sheet is sensed, the control unit 20 returns the affected rolls 12 to their normal orientation. Depending on where the sensor is located, the control unit can be programmed to reorient the rolls to normal position in sequence after the trailing edge of the sheet clears the rolls to be oriented. In the alternative, the rolls 12 may be reoriented as a group after the sheet leaves the rolls. Since the computer may be programmed as to sheet speed, length and separation between sheets, it is relatively simple to provide the necessary circuitry for reorienting the rolls in the manner described above. The conveying and routing operations are carried on continuously, and as the equipment at the output station is filled to capacity, the sheets are automatically routed by the control unit to a different station while the equipment is unloaded or replaced. Routing to a different station is best achieved by placing a weight sensor in each accumulator such as a strain gage, or a simple spring loaded potentiometer (not shown) to signal the control unit when the output equipment is full. Of course, height sensors such as beams of light can be placed adjacent each output station to determine when the station is full to capacity in place of the strain gage or potentiometer described above.

Figure 3:
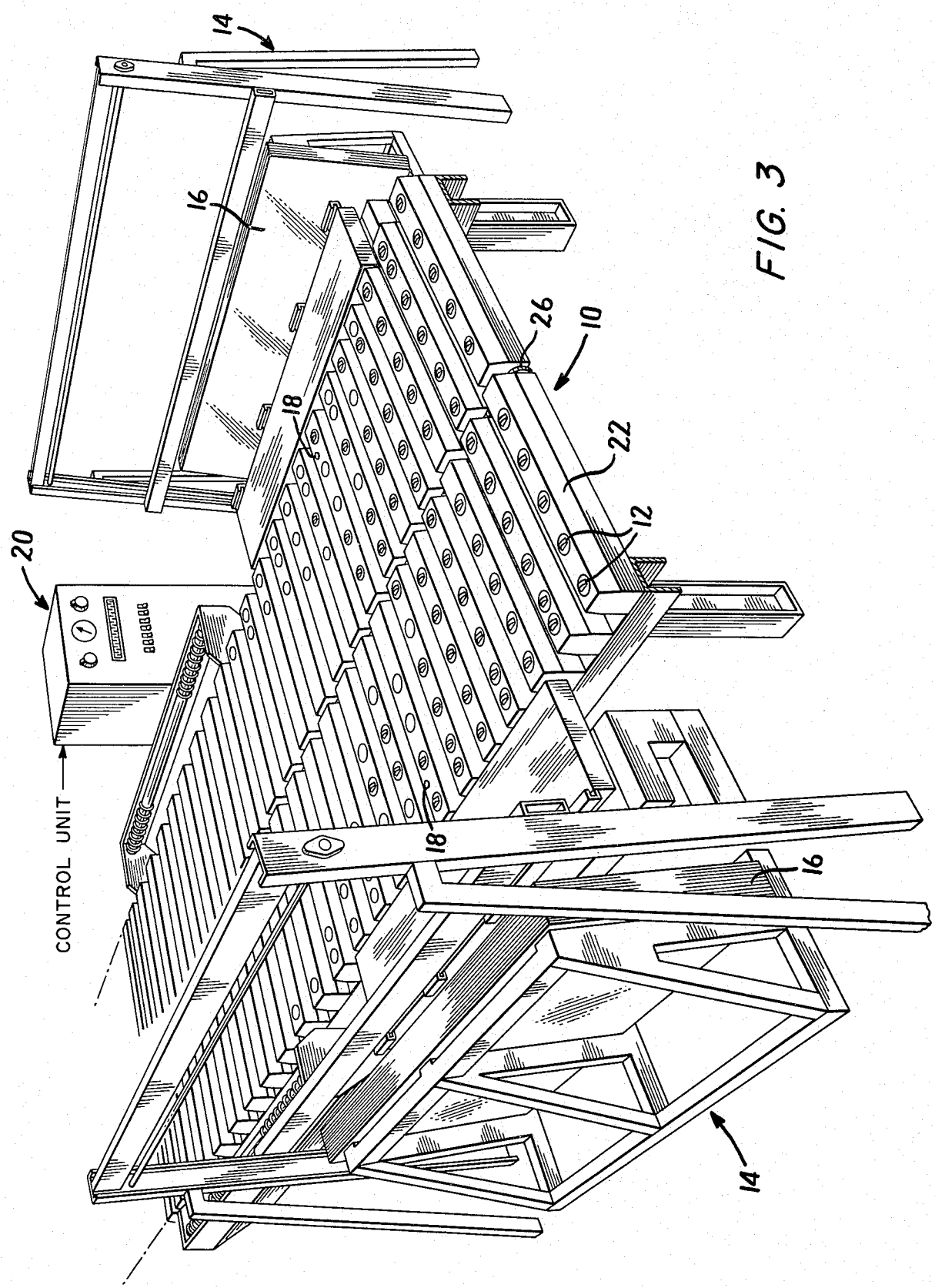
FIG. 3 is a perspective view of a portion of the device showing accumulators at two of the output stations.

As seen in FIG. 3, each assembly 13 is embedded in a detachable unit called a module 22. The device itself is composed of a plurality of modules 22 placed side by side. The number of modules 22 will depend upon the number of output stations necessary and the capacity of the device desired for any particular application.

FIG. 4 shows a closer view of two adjacent modules 22 as a sheet 16 approaches its selected output station. Each module 22 consists of a plurality of roll assemblies 13, each of which in turn has a roll 12 which is driven by a shaft 24. Shaft 24 extends the length of the module 22 and is rotated by means of chain drive 26 connected to shaft 24 in a conventional manner. Chain drive 26 is powered by a conventional motor (not shown) to drive the rolls 12 at a speed determined and controlled by the control unit 20. Thus, each roll 12 is simultaneously and continuously powered by chain drive 26 to move the sheet 16 along the device.

Figure 7:
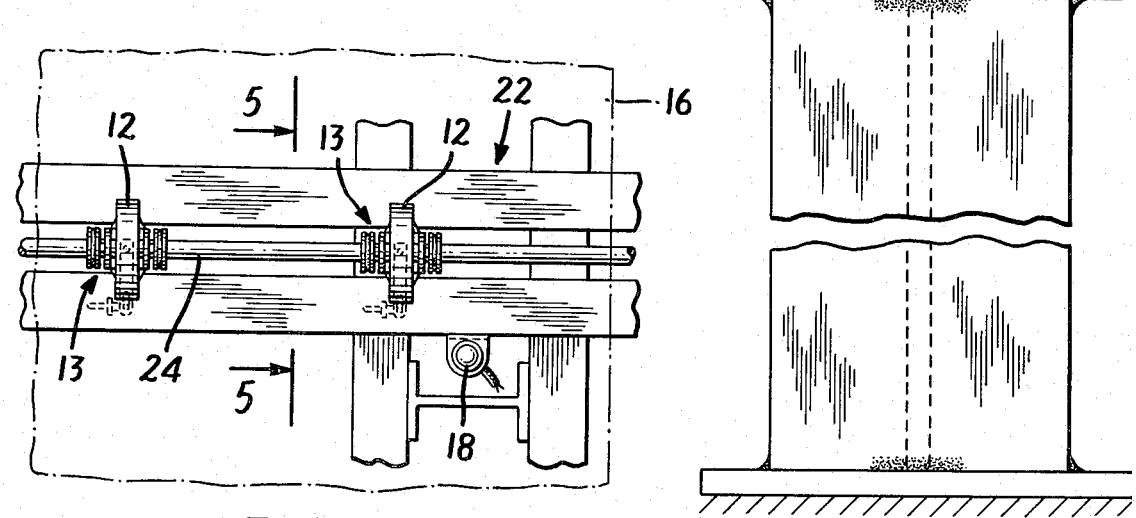
FIG. 7 is a schematic representation of an electronic sensor.

FIG. 4 also shows one of the sensors 18. Sensors 18 can either be pneumatic, such as the one shown in this figure, or electronic, as shown in FIG. 7. These sensors are conventional and commercially available. Other types of sensors, such as the photoelectric type, can also be used, if desired. The pneumatic sensors produce a conical air column immediately above the sensor. As the sheet passes over the sensor, a change in pressure is detected indicating the presence of a sheet. The electronic sensors function in a similar manner. An electronic beam is focused into the path of the sheets. When a sheet glass or otherwise is overhead, the beam if bounced back to the sensor, and detected. Photo sensitive sensors function by the interruption of a light beam which change the amount of light entering a photo sensitive cell, thus causing the device to sense the presence of a sheet. Each sensor is connected to the control unit 20 so that information concerning the location of each sheet 16 is continuously fed into the unit 20. Where a non-electric sensor is used, the signal from the sensor is converted to an electrical signal for input to the computer. This can be achieved conventionally such as by use of a pressure sensitive switch connected in an external electric circuit which controls current flow in the circuit in response to pressure changes. Any one of the aforementioned types of sensors are readily adaptable for use in the device. Sensors 18 are also located at each output station 14 to sense the sheets as they are moved onto the station. The control unit 20 is pre-programmed with information concerning the equipment at the station, as described above. When the equipment is full, sheets are routed to other stations until the equipment is emptied.

Means for orienting the rolls 12 are provided adjacent each roll 12. In FIG. 4, some of the possible types of orientation means are illustrated. The orienting means may be of the solenoid (FIG. 4) or pneumatic (FIG. 6) type. Commercially available solenoid 28 shown connected to rolls 12 by means of rod 30 are provided to orient the rolls 12. When the sensors 18 detect the presence of a sheet 16 in the proper position, the control unit 20 activates the appropriate solenoids 28 which permit rods 30 to extend a selected amount, thus orienting those rolls 12 which are needed to guide the sheet to the selected output station. As an alternative, pneumatic cylinders 50 (FIG. 6) can be used instead of solenoids 28 to perform the same function.

Figure 5:
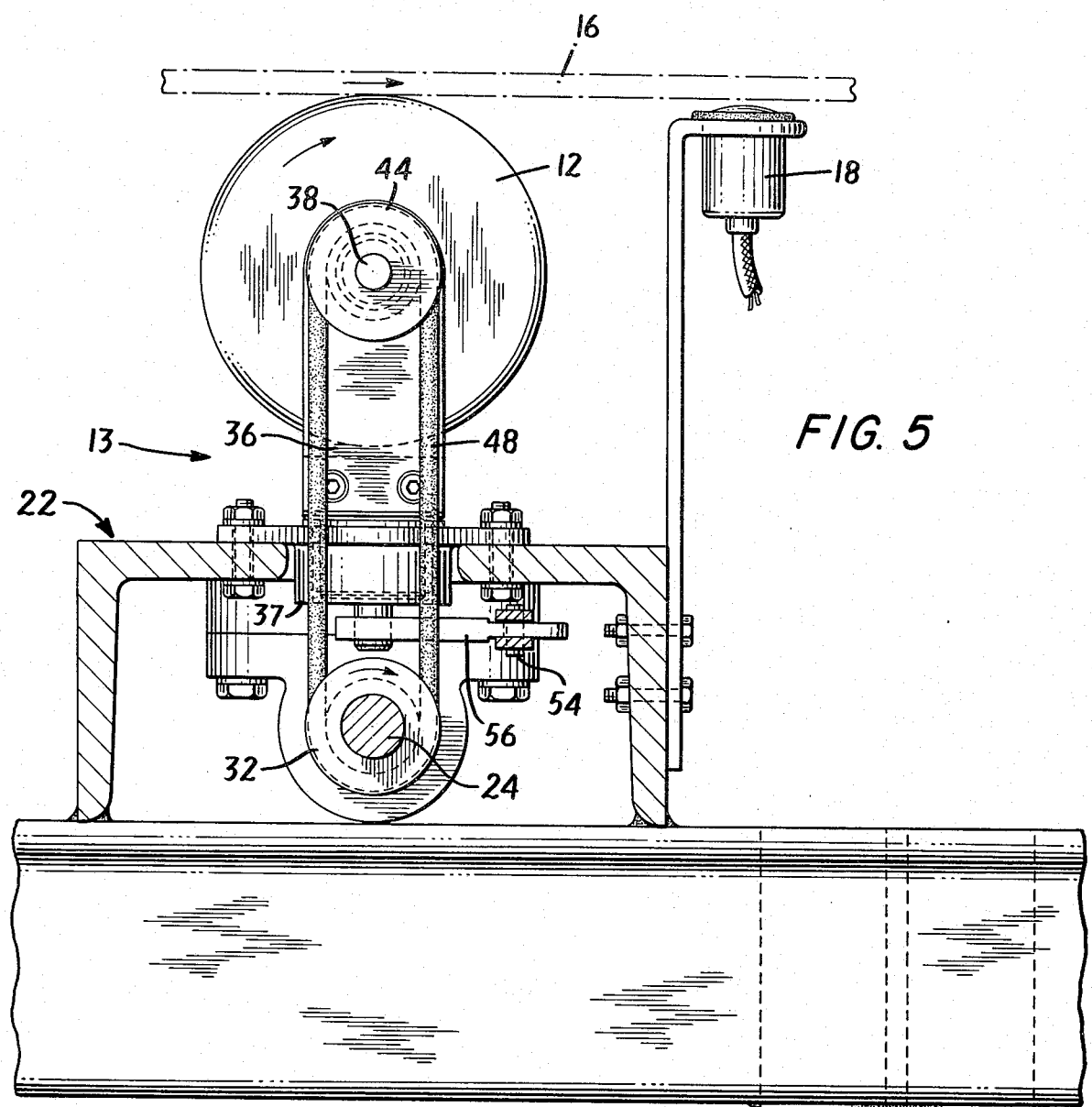
FIG. 5 is a side cutaway view of a roll showing the means for driving the roll.
Figure 6:
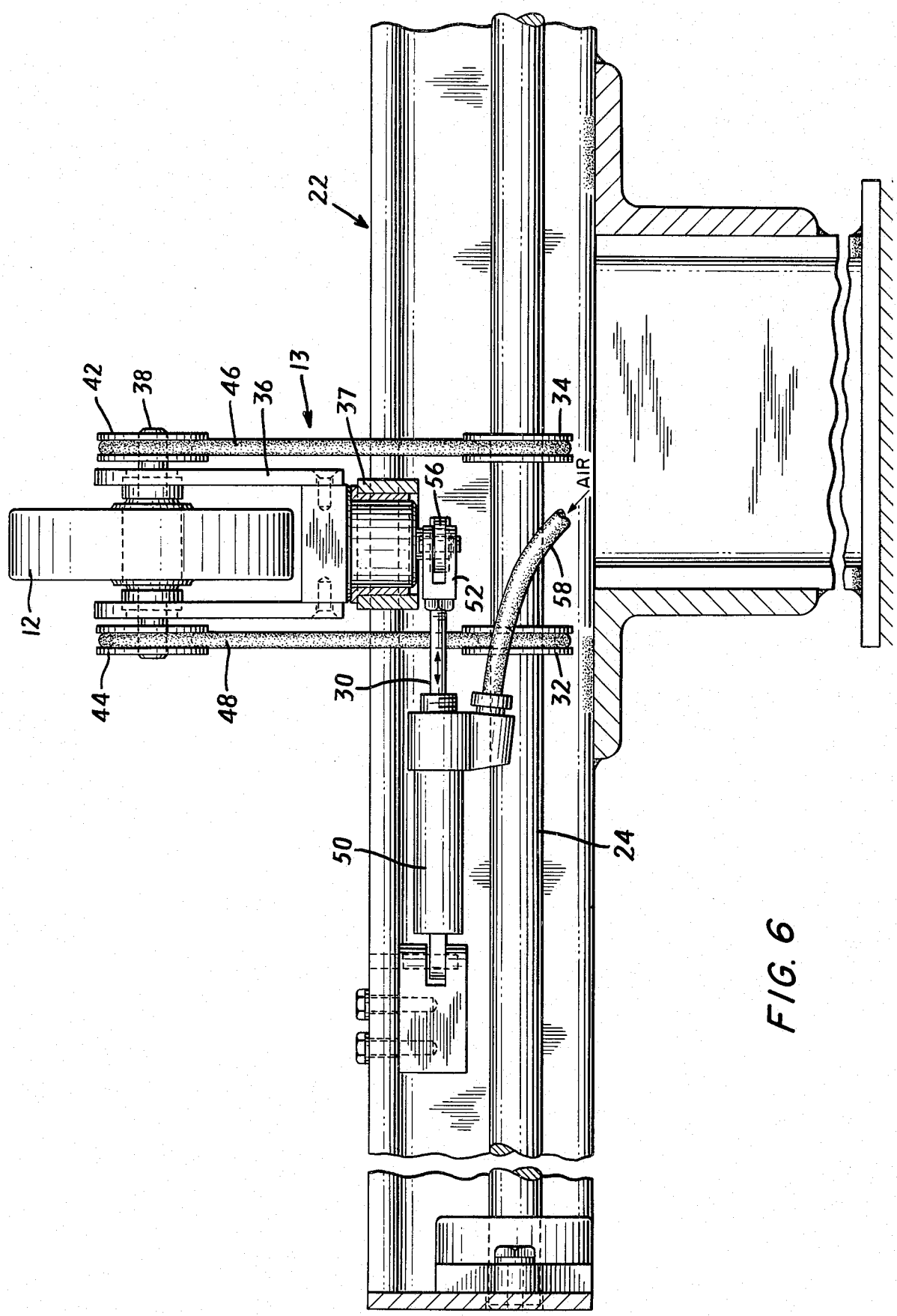
FIG. 6 is a front cutaway view of the roll and the roll support means as well as the means for orienting the roll support means.

FIGS. 5 and 6 show the roll support means and the means of transferring torque from drive shaft 24 to the roll 12. Beneath each roll 12, situated on the drive shaft 24, are two pulleys 32 and 34. The roll 12 itself is rotatably mounted on a clevis 36 by shaft 38 which extends beyond the prongs 40 of clevis 36. Clevis 36 is rotatably mounted in module 22 by means of collar 37 into which the bottom or pin portion of clevis 36 is placed. On the end of each shaft 38 is situated a pulley 42 and 44, respectively. Pulley 42 is connected to pulley 34 on shaft 24 by means of a continuous flexible belt 46. Likewise, pulley 44 is connected to pulley 32 by means of a continuous flexible belt 48. As shaft 24 is turned, pulleys 34 and 32 move belts 46 and 48, respectively, to rotate pulleys 42 and 44; and thus driving roll 12. Belts 46 and 48 are flexible enough to compensate for the orientation of roll 12 and still drive the roll 12 at the required speed. The orientation means, shown here as an air cylinder 50, is connected to clevis 36 by means of rod 30 with a bracket 52 fixedly mounted to its end.

As seen in FIG. 5, bracket 52 is rotatably connected to rod 56 by means of pin 54. The other end of rod 56 is fixedly mounted to the bottom of clevis 36 by an extension or pin 55. As can be readily appreciated, air cylinder 50 is mounted such that shaft 30 acts on bracket 52. Bracket 52 is spaced from the center of rotation of pin 55 so that any extension of rod 30 will rotate roll 12. When an air cylinder 50 is energized by air entering through hose 58 (or alternatively, solenoid 28 is energized), rod 30 is moved toward clevis 36 pushing bracket 52 to move rod 56 and rotate pin 55. This action serves to orient roll 12. When the solenoid 38 or air cylinder 50 are de-energized, an internal spring (not shown) moves rod 30 and thus roll 12 back to its original position. Air cylinder 50 and solenoid 38 are two alternative methods to accomplish orientation and either one can be used successfully. However, as indicated below, solenoids are preferable because of the ease of connection between the control unit 20 and the solenoid 28.

The control unit comprises a commercially available computer and related interfacing equipment. GRI-99, Model 40, produced by the GRI Computer Corporation is one such unit which has proved acceptable. The computer is connected to the system by means of appropriate electronic interfacing equipment, also commercially available, which is used to convert input to the computer to an acceptable low power value and, alternatively, to convert output to the rolls to an acceptable level for the rolls. The sensors and means for orienting the rolls are connected directly to the interfacing equipment as inputs and outputs, respectively. Since the interfacing equipment is electronic, it is convenient and preferable to use electronic sensors and to use solenoids as the orientation means. This eliminates the necessity for air pumps and the like, and provides simpler interfacing. However, pneumatic devices can be used instead of the electronic ones along with appropriate pneumatic or fluidics controls, or with electrical energy converters to convert the pneumatic signals to electrical signals, if desired.

Each sensor 18 sends an electronic signal to control unit 20 as long as a sheet 16 is in position to be sensed. Thus, the computer is aware of the location of each sheet along the device. The computer also is programmed with information concerning the capacity of the equipment at each output station.

The control unit is additionally aware of whether or not a particular output station is full. This is best achieved with a height or weight sensor (conventional) which signals the computer when a selected degree of output station loading has been achieved. With this information, the computer directs the interfacing equipment to orient the rolls 12 to guide the next successive sheet 16 into the appropriate output station. When a station is full to capacity, no more sheets are guided towards it until it has been emptied as described earlier.

In addition, a scanning device (not shown) can be located at a position upstream of the present invention. This scanning device can be used to detect imperfect glass as it approaches the conveyor. The scanning device is also connected to control unit 20 so that when the imperfect glass enters the device, it is directed towards a scrap bin located at one of the output stations. The scanning device may be a simple light output detector of the type described in connection with sensor 18 which depends on reflectance from a surface to activate a switch. A broken sheet of glass will scatter light at the break, thereby not reflecting enough light to the sensor. When this occurs, a signal is sent to the computer indicating the location and position of the broken glass.

It is to be noted that the apparatus of the instant invention is designed to carry two or more sheets abreast. If more than two sheets are so carried, sensors must be located along the travel path of each line of sheets. Each sensor will be associated with a selected output station to feed sheets to the said station. As before, if a particular station is full, the sensor associated with that station will be deactivated and subsequent sheets along the same line of travel will move to the next output station. Of course, the sheets originally earmarked for the new output station will also be deposited in the said output station until it is full and the remaining sheets shifted to the next subsequent output station. After a new output station has been moved alongside the conveyor in place of one which has been filled, the sensor for that station is automatically reactivated to again route sheets into the newly available output station.

Although the description speaks of only one sensor per output station, it is to be understood that a plurality of sensors for each output station can be used, if desired.

In many situations, the conveyor may be required to carry as many as six sheets of material abreast, or even more if desired. The apparatus of this invention may be used to move sheet material directly from a manufacturing or assembly line. The plurality of sheets coming from the line tend to stay close to each other to the point where two adjacent sheets may rest on a single roll, which may hamper the movement of the sheets to the various selected output station. To avoid this, a separation section 60 may be added upstream of the conveyor to separate the sheets or "lites" as they are more commonly known. Separation section 60 is shown carrying six sheets abreast, although it is to be understood that more or less sheets can be handled by the separation section depending on sheet size.

Figure 8:
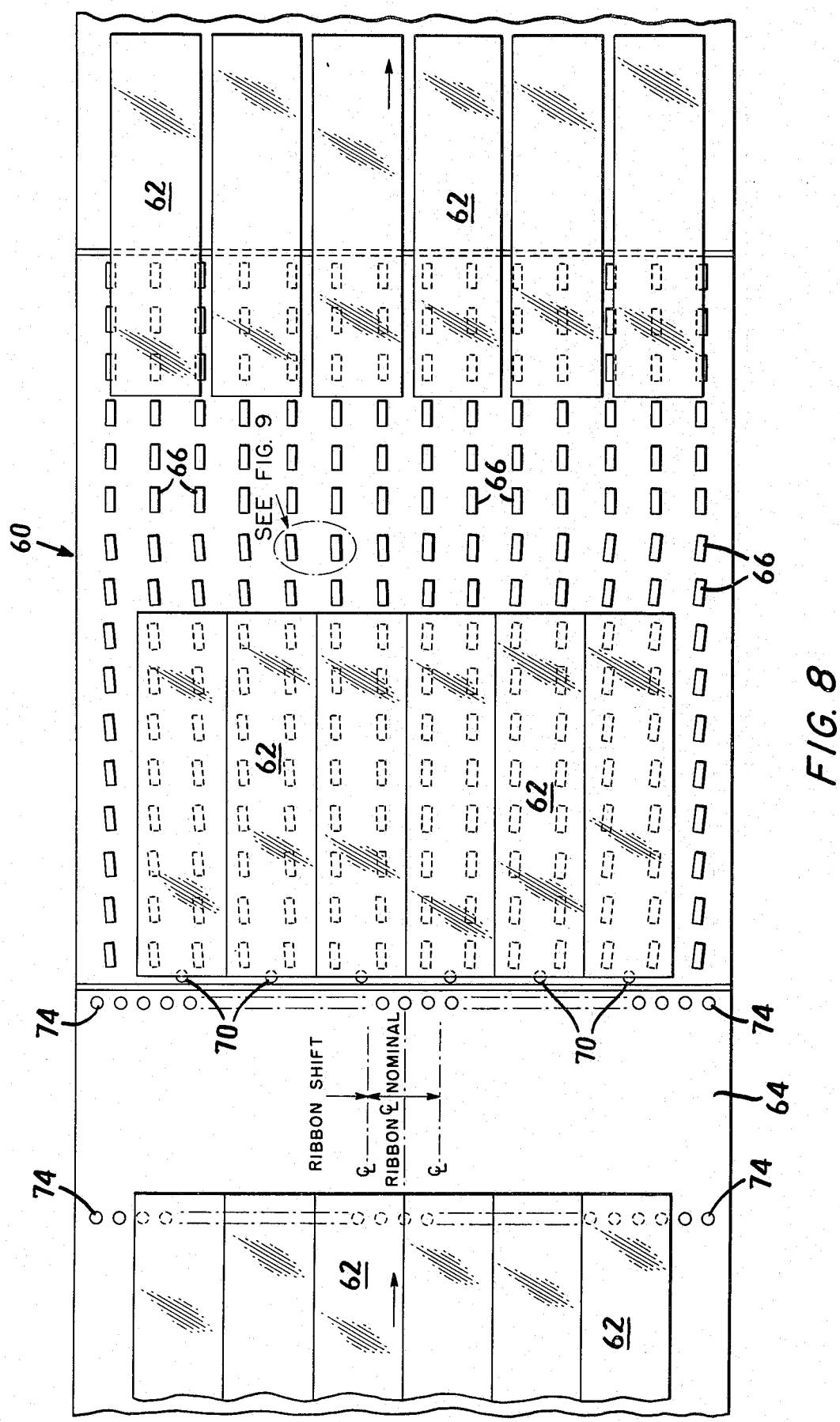
FIG. 8 is a top plan view of a separator for use with the apparatus of FIGS. 1–7.
Figure 9:
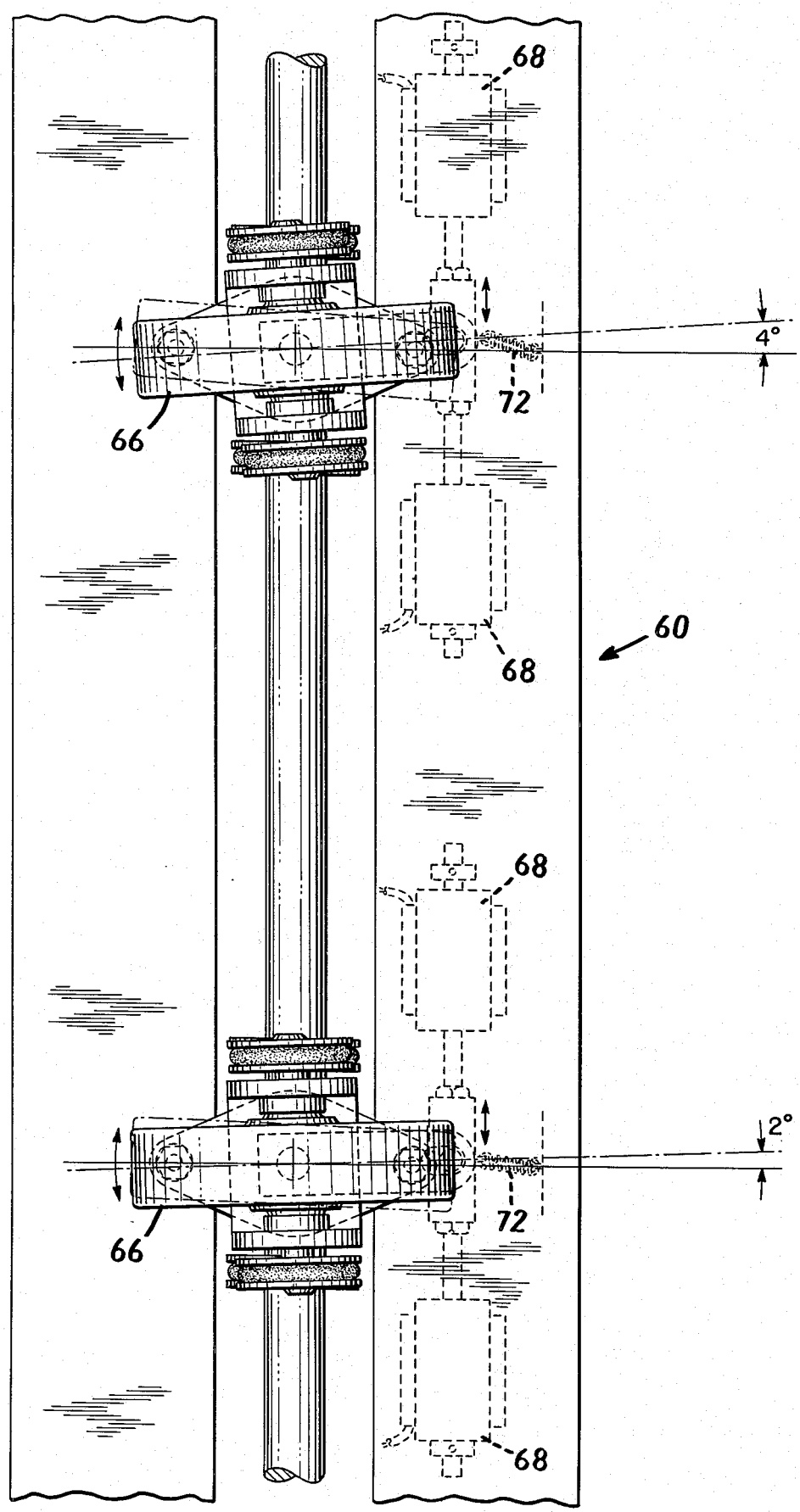
FIG. 9 is a detail view of one roll in the apparatus of FIG. 8.

As shown in FIG. 8, the sheets 62 are carried closely abreast of each other on a conventional conveyor ribbon 64 to separation section 60. Separation section 60 consists of a plurality of rolls 66 connected to a conventional variable speed motor drive (not shown). Associated with each roll 66, which is mounted in a roll assembly (not shown) exactly as described for rolls 12 above, is a pair of solenoids 68 (FIG. 9) of exactly the same construction as shown for the conveyor assembly. Solenoids 68 are connected to the control unit 20, and can activate each roll for movement either above or below the 0° line shown in FIG. 9.

As shown in FIG. 8, the sheets 62 enter the separation section abutting each other. A sensor 70, preferably electronic although other types of sensors may be used as described earlier in this specification, is positioned near the leading edge of the separator section to sense the impending presence of sheet material. The sensor signals the control unit 20 that the sheet has entered the separation section. When the trailing edge of the sheet passes over the sensor, the sensor signals the computer of this fact. The computer is programmed to activate selected solenoids for a selected time interval depending on the speed at which the sheet is being moved, to reorient selected roll assemblies a few degrees to separate the sheets a selected amount. Time intervals on the order of about one second have generally been found sufficient for separation purposes within a wide range of sheet speeds. Roll reorientation should generally be kept to within the range of 2° to 6° off center, although more or less may be provided for if desired. As before, the computer in control unit 20 is preprogrammed with the number of sheets abreast, conveyor speed, sheet size, etc. to enable the computer to activate appropriate solenoids to reorient appropriate rolls. Of course, information concerning sheet location is also programmed into the computer to enable the computer to select the appropriate roll assemblies for orientation at the proper time.

In a separator adapted to carry multiple sheets abreast of each other, each roll should be individually reorientable through at least two, and preferably three or more positions, i.e. 2°, 4° and 6°.

When a plurality of sheets are to be separated, the outermost sheets will be moved a greater distance laterally than will the innermost sheets. For example, in a six sheet abreast configuration, the two innermost sheets may be set to move apart 1 inch. The two sheets bordering the center sheets will have to move the first inch and an additional inch as well.

The solenoids for each roll are connected to extensible shafts as shown in FIG. 4. The three different positions may be achieved by having each solenoid respond to three different inputs corresponding to shaft movement sufficient to reorient the roll assembly by the desired amount. Any conventional apparatus for selecting position may be used in place of the multiple input solenoid described herein.

As an example, the separator section may be provided with 224 rolls having 448 solenoids. The separator section is provided with fourteen rolls per row. The width of the separator is 120 inches and length is 12 feet. Assuming the use of six sheets abreast, the three end rolls in each row will be reoriented 6° towards the periphery of the separator section. The next two rolls (toward the center) on each side of center will be reoriented four degrees, and the remaining two rolls to each side of center will be reoriented by 2°.

Each roll is preferably provided with a spring 72 to provide for automatic return of the roll after current to the solenoid is shut down.

For best results, the ribbon 64 which carries the sheets to the separator section should have its centerline travel monitored to ascertain any shift in position of the ribbon. This may be achieved by use of a plurality of sensors 74 placed under the ribbon which are adapted to receive reflected light from a reflecting strip placed along the ribbon centerline. The sensors are the same as described earlier. If the ribbon centerline has shifted, the sensors will indicate the degree of shift to the control unit 20. The control unit 20 will then activate different rolls to varying settings to compensate for the shift in ribbon centerline with the attendant shift in the position of the sheet material.

For proper operation, the circuits which control reorientation of the rolls are energized only for the amount of time necessary to produce the desired spacing between sheets. After the circuits are de-energized, springs 72 return the rolls to the 0° line and the sheets continue to the conveyor for movement to the various selected output stations.

It is to be understood that the computer described herein is used as a sophisticated switching unit controlling a number of switches corresponding to the individual functions or items to be controlled. The apparatus itself is connected to a standard 110 volt 60 cycle AC source which source energizes all components such as sensors, roll drives, solenoids, etc. The function performed by these individual items is conventionally initiated by the computer acting as a switch. In addition, the interfacing equipment described herein is conventional and is adapted to convert the signals fed to the computer by the apparatus to a manageable power level for control purposes.

It will be understood that I intend to cover all changes and modifications of the preferred form of my invention herein chosen for purposes of illustration which do not constitute departures from the spirit and scope of my invention.

What is claimed is:

1. Apparatus for conveying and selectively routing one or more sheets of glass material comprising a plurality of modules each having a plurality of roll assemblies therein, each roll assembly having a plurality of rolls therein, each roll having a surface or portion of which extends upwardly from the roll assembly; and means for driving said rolls and for preventing bits of glass from interfering with the driving means comprising a shaft; a plurality of friction belt means mounted on said shaft and on each said roll assembly, said friction belt means being below the exposed surface of said roll, and means for providing driving power being external to said roll module; at least one output station positioned along a side of said device; and means for moving each of said roll assemblies through a preselected arc to change the direction of movement of said sheets to feed said sheets to said at least one output station.

2. The device specified in claim 1 further comprising means for sensing the presence of a sheet at at least one selected location along said apparatus, and means for automatically activating said means for changing the direction of movement of said sheets when the presence of said sheet has been sensed, said means for sensing the presence of said sheet being connected to said automatic activating means.

3. Apparatus according to claim 2 comprising a plurality of roll assemblies mounted in each said module, each said roll assembly having a single roll mounted thereon, said means for changing the direction of movement of said sheets comprising a control unit, each said sensor being connected to said control unit, individual control means for each roll assembly connected for activation by said control means and mounted on said apparatus in a manner to cause said assembly to move to change the direction of movement of a sheet in response to a signal from said control unit.

4. Apparatus according to claim 1 wherein said modules are closed rectangular conduits having a first plurality of openings for permitting the surface of said rolls to extend above the surface of said roll assemblies, and at least one additional opening for said shaft.

5. Apparatus according to claim 1 further comprising means for moving each of said roll assemblies through a pre-selected arc to change the direction of movement of said sheets.

6. Apparatus according to claim 5 wherein said means for moving each of said roll assemblies through a pre-selected arc comprises a second shaft extending from the center of movement of said roll assemblies, and means for applying a force to said second shaft which in turn applies a moving torque to said roll assembly.

7. Apparatus according to claim 5 wherein said roll assembly comprises a clevis.

8. Apparatus according to claim 2 wherein said means for changing the direction of movement of said sheets comprises a control unit, each said sensor being connected to said control unit, individual control means for each roll assembly connected for activation by said control means and mounted in a manner to cause said assembly to move to change the direction of movement of a sheet in response to a signal from said control unit.

9. Apparatus according to claim 8 wherein said apparatus has a plurality of output stations placed along the periphery thereof and wherein said computer further comprises means for selectively activating a plurality of roll assemblies in accordance with the number of sheets which have previously been routed to a particular output station such that a sheet is routed to an output station which is not full to capacity.

10. Apparatus according to claim 8 wherein said control unit comprises a computer.

11. Apparatus according to claim 8 wherein said control means comprises a solenoid having an extendable rod for applying a torque force to said assembly to cause said assembly to turn.

12. Apparatus according to claim 8 wherein said control means comprises an air cylinder having an extendable rod for applying a torque force to said assembly to cause said assembly to turn.

* * * * *